United States Patent
Nunn

(10) Patent No.: US 6,438,688 B1
(45) Date of Patent: Aug. 20, 2002

(54) METHOD AND COMPUTER FOR LOCALLY AND REMOTELY UPDATING A BASIC INPUT OUTPUT SYSTEM (BIOS) UTILIZING ONE UPDATE FILE

(75) Inventor: Susan Nunn, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/275,590

(22) Filed: Mar. 24, 1999

(51) Int. Cl.[7] .............................................. G06F 9/445
(52) U.S. Cl. ............................. 713/2; 713/1; 713/100; 709/220; 710/10; 710/104
(58) Field of Search ........................... 713/1, 2, 100; 709/220, 221, 222; 710/8, 10, 104

(56) References Cited

U.S. PATENT DOCUMENTS

| | | |
|---|---|---|
| 5,155,847 A | 10/1992 | Kirouac et al. |
| 5,245,615 A | 9/1993 | Treu |
| 5,444,438 A | 8/1995 | Goldberg |
| 5,473,772 A | 12/1995 | Halliwell et al. |
| 5,564,051 A * | 10/1996 | Halliwell et al. ........... 395/600 |
| 5,577,244 A | 11/1996 | Killebrew et al. |
| 5,581,703 A | 12/1996 | Baugher et al. |
| 5,594,900 A * | 1/1997 | Cohn et al. ................. 395/600 |
| 5,732,268 A | 3/1998 | Bizzarri |
| 5,771,381 A | 6/1998 | Jones et al. |
| 5,809,251 A | 9/1998 | May et al. |
| 5,964,873 A * | 10/1999 | Choi .............................. 713/2 |
| 5,987,536 A * | 11/1999 | Johnson et al. ............... 710/36 |
| 5,999,740 A * | 12/1999 | Rowley ......................... 711/11 |
| 6,009,524 A * | 12/1999 | Olarig et al. ................ 713/200 |
| 6,188,602 B1 * | 2/2001 | Alexander et al. ...... 365/185.04 |

\* cited by examiner

*Primary Examiner*—Jeffrey Gaffin
*Assistant Examiner*—Rijue Mai
(74) *Attorney, Agent, or Firm*—Haynes and Boone, LLP

(57) ABSTRACT

A method and computer for locally and remotely updating a BIOS using one update file that contains a local update program and a BIOS image. To locally update a client's BIOS, the system administrator can run the update file. To locally update program would then write the BIOS image to the client's computer memory thereby completing the local update. If, however, the system administrator wishes to remotely update the client's BIOS, the update file is run using an input parameter (such as a command line switch). This action causes the local update program to create a file containing the BIOS image with a header. Using this file, a remote update program writes the BIOS image to the client's computer memory.

9 Claims, 2 Drawing Sheets

METHOD AND COMPUTER FOR LOCALLY AND REMOTELY UPDATING A BASIC INPUT OUTPUT SYSTEM (BIOS) UTILIZING ONE UPDATE FILE

BACKGROUND

This disclosure relates generally to correcting problems associated with updating the basic input output system (BIOS) of a computer and, more particularly, to a method and computer for locally and remotely updating a BIOS using one update file.

When a computer (or any similar system or component) is powered on, or booted, basic input output system (BIOS) initialization code is used by the computer to test its hardware and connectivity and to load all of the necessary operating code that allows the computer to perform needed tasks. The BIOS initialization code, which is stored in memory (e.g. lash memory and/or any device that stores digital information and can store the BIOS initialization code), includes a power-on self test (POST) procedure, to ensure that all computer circuitry is functional before running the operating code. The BIOS initialization code may be accessed by a processor (e.g. central processing unit (CPU), digital signal processor (DSP), microprocessor, microcontroller, microcomputer, and/or any device that manipulates digital information based on programming instructions) when the computer is booted. The BIOS, in addition to other functions that are loaded (e.g. reading and writing data to various storage systems such as CD-ROM and DVD-ROM drives), allow the computer to perform its vast array of features. The code that gives the computer this ability is called the operating system (OS). The OS is stored in a non-volatile storage module such as a hard disk. When the computer is booted (or reset) the BIOS code is run and, after POST, the BIOS code allows access to the hard disk at an address where code is stored which permits tile loading of the OS from the hard disk. After the OS is loaded, a user may begin to access various features found the OS (e.g. a spreadsheet, etc.) or accessed through the OS (e.g. the world wide web, email, etc.).

Several situations exist in which the BIOS may have to be updated. These situations include providing new BIOS features or functionality or providing fixes to certain BIOS problems. For example, a computer may need to receive a Year 2000 (Y2K) fix to ensure it operates correctly. The Y2K fix may be placed in the BIOS initialization code. After the BIOS has been updated, the computer can be rebooted thereby enacting the Y2K fix.

In such a situation, the updating can be performed locally and/or remotely. If the updating were to be performed locally, the BIOS would be updated on a client's local computer by executing a BIOS update program. A system administrator would most likely perform the update. The BIOS update program would replace the previous BIOS image in the computer's flash memory with the image contained in the update program. If the updating were to be performed remotely, a system administrator would remotely update the client's computer BIOS. When a system administrator locally updates a BIOS, a local update program is used and, when the system administrator remotely updates a BIOS, a remote update program is used.

Since separate BIOS files are used to locally and remotely update tile BIOS, problems can arise. Since each file has a separate identification number or label, the system administrator may use the wrong file (i.e. identification number) to perform a certain update causing various errors and delays. Having separate BIOS files to locally and remotely update the BIOS is costly, time consuming, and degrades the user's experience.

SUMMARY

The present disclosure, therefore, provides a method and computer for locally and remotely updating a BIOS using one update file that contains a local update program and a BIOS image that can be used for local or remote updates. To locally update a client's BIOS, the system administrator can run the update file. The local update program would then write the BIOS image to the client's computer memory thereby completing the local update. If, however, the system administrator wishes to remotely update the client's BIOS, the update file is run using an input parameter (such as a command line switch). This action causes the local update program to create a file containing the BIOS image with a header. Using this file, a remote update program is executed which writes the BIOS image to the client's computer memory.

A major advantage is achieved with the method and computer of the present disclosure since only one file is used by a system administrator to perform local and/or remote BIOS updates. As such, the problems discussed above are minimized allowing for a more efficient solution that increases the client's experience.

DETAILED DESCRIPTION

Figure 1:
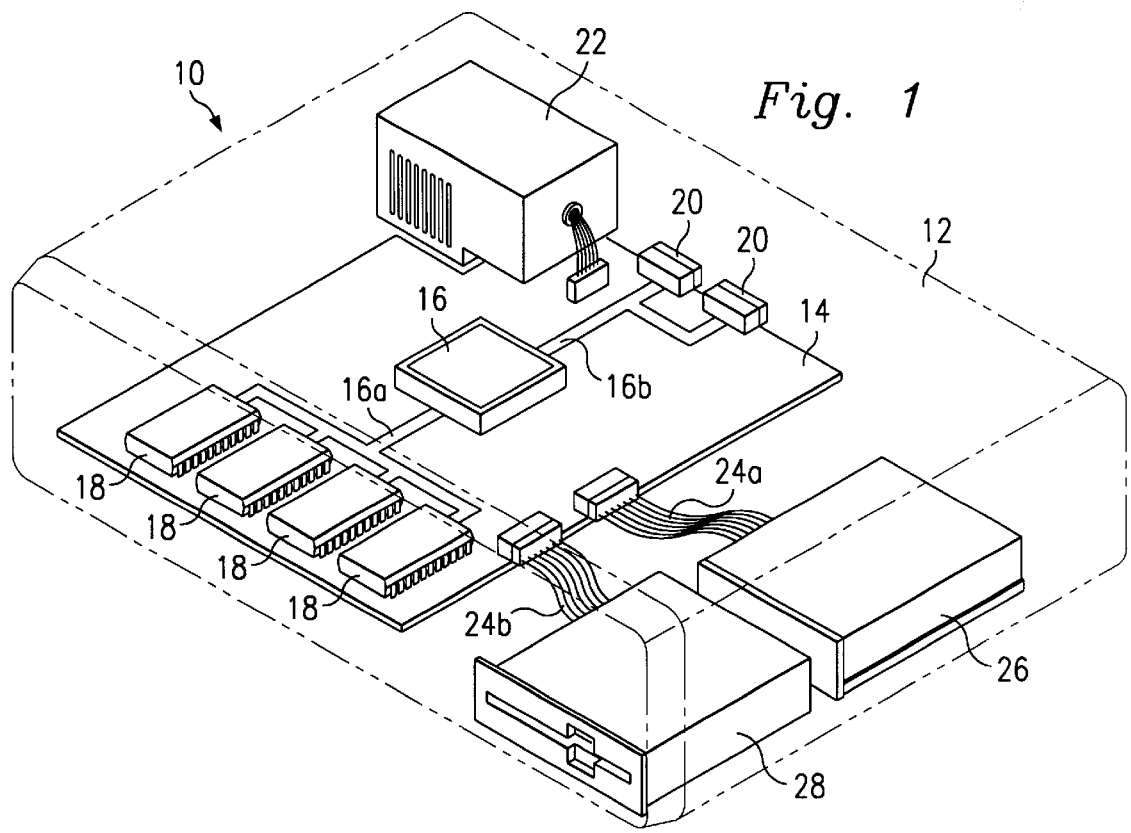
FIG. 1 is a diagrammatic view depicting some of the basic components of the computer of the present disclosure.

FIG. 1 depicts a personal computer, shown in general by the reference numeral 10, which can be in the form of a desktop computer, a laptop computer or a tower computer. The computer 10 includes a chassis 12 in which a motherboard 14 is mounted. A processor 16, a plurality of memory modules 18, and two I/O devices 20 are mounted on the motherboard 14. Two buses 16a and 16b are also provided on the motherboard 14 and connect the processor 16 to the memory modules 18 and to the input/output devices 20, respectively. A power supply 22 is connected to the motherboard 14, and a pair of cable assemblies 24a and 24b connect the power supply to a hard drive unit 26 and a disk drive unit 28, respectively. It is understood that other components, electrical traces, electrical circuits and related devices (not shown) are provided in the chassis 12. Since these are all conventional, they will not be described in any further detail.

Figure 2:
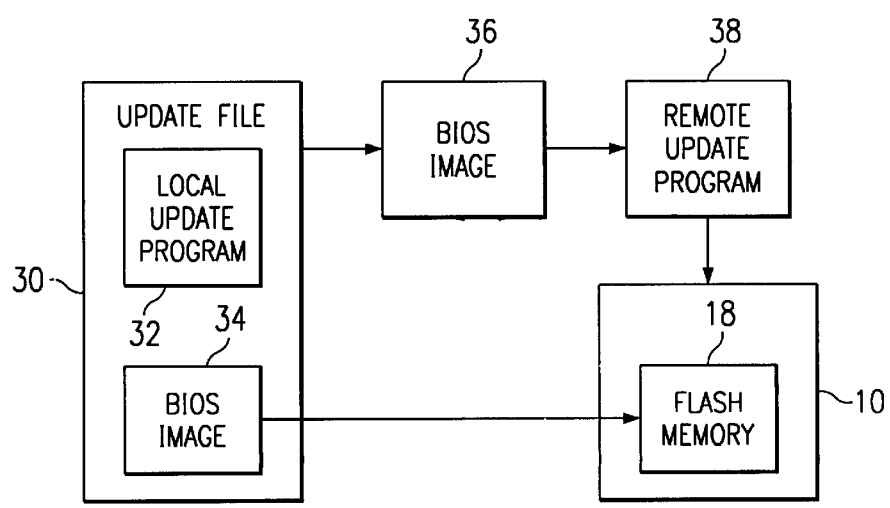
FIG. 2 is a diagrammatic view of the computer being locally and remotely updated via a single update file in accordance with the present disclosure.

FIG. 2 depicts the computer 10 that includes the memory modules 18. The memory modules 18, which may be flash memory and/or any device that stores digital information and can store the BIOS initialization code, are contained in and/or operably coupled to the computer. When the BIOS initialization code is to be updated (to add new features to an older BIOS version or to correct bugs with a current BIOS version), the system administrator can use one BIOS image update file 30 for locally and remotely updating the BIOS. The update file 30, which is sent to the system administrator, contains a local update program 32 and a BIOS image 34. The update file 30 may be sent to the system administrator by a company initiating the changes to the BIOS (e.g. Dell Computer Corporation) on a diskette or other medium able to transfer digital information (e.g. email, database download, etc.). To locally update a client's BIOS, the system administrator can run the local update file 30. For example, if the update file's 30 name is XYZ, the system administrator would type XYZ at the appropriate command line and initiate the local update. As the update file 30 is run, it would begin to write the BIOS image 34 to the client's flash memory 18. When the local update is complete, the new BIOS image will have replaced the older image.

The system administrator may also remotely update the client's BIOS utilizing the same update file 30. The update file 30 is run using an input parameter (such as a command line switch). For example, the system administrator would type XYZ/write_hdr_file at the appropriate command line. This action causes the local update program 32 to create a file 36 containing the BIOS image with a header. The file 36 is extracted and used as input to a remote update program 38 while the header on the file 36, is used to identify the file to the remote update program 38. The file 36 is then processed by the remote update program 38 which writes the BIOS image to the client's computer flash memory 18 thereby completing the remote update.

The remote update program 38 can be used to remotely update the BIOS image in every computer in the network and can also provide information regarding the software, hardware, and/or status of every computer via a monitoring function. For example, the system administrator can use the remote update program 38 via a particular application (e.g. Dell Computer Corporation's Open Manage™) to receive information such as the type of software running on a computer or whether the computer is on-line or off-line. This type of information may be retrieved remotely for every computer in the system administrator's network. Such system management statistics are very valuable to a system administrator as they may indicate the state of every individual computer and the entire network.

In addition to a system administrator, the BIOS image may be locally and/or remotely updated by a user and/or an automated process. Although a single user (as opposed to a client whose BIOS is updated by a system administrator) may not generally be responsible for running system management programs, the user may perform the necessary update functions. In such a scenario, the user may, for example, locally or remotely download to his/her computer the update file 30 from a database via the world wide web. The functionality of the update file 30 is similar to that described above and would be used to update the BIOS.

Further, the updating may be automatically initiated and completed. For example, a computer may be loaded with the update file 30 and given instructions to update the BIOS of every computer or to update specific computers in the network at a particular time. Additionally, the computer may have intelligence built in that, when a certain criteria is met (e.g. a threshold is crossed), the computer automatically acts to update the BIOS.

Figure 3:
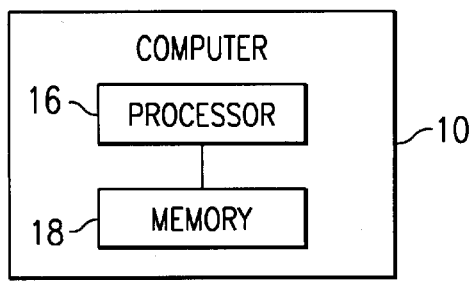
FIG. 3 is a diagrammatic view of the computer and memory of the present disclosure.

FIG. 3 depicts the computer 10 that comprises the processor 16 and memory 18. The memory 18 is operably coupled to the processor 16 and stores programming instructions that, when read by the processor, cause the processor to write, using a update file that contains a local update program and a BIOS image, the BIOS image to the memory. The programming instructions further cause the processor to create a file containing the BIOS image with a header; execute a remote update program, process the file by the remote update program (which includes utilizing the header to identify the file to the remote update program); and write, using the remote update program, the BIOS image to the memory. The processor 16 and the memory 18 perform similar functions to those discussed in FIG. 2 and thus will not be described further.

Figure 4:
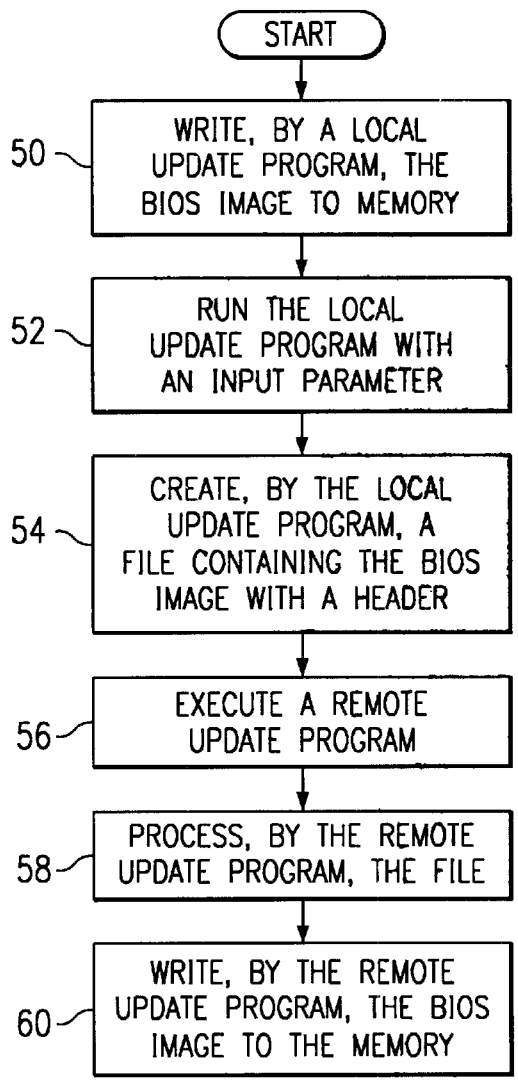
FIG. 4 is a flow chart depicting a method for locally and remotely updating a BIOS with one update file that contains a local update program and a BIOS image in accordance with the present disclosure.

Referring to FIG. 4, a method for locally and remotely updating a BIOS with one update file that contains a local update program and a BIOS image begins at step 50 where the local update program writes the BIOS image to memory. At step 52, the local update program is run with an input parameter. The method proceeds to step 54 where the local update program creates a file containing the BIOS image with a header. At step 56, a remote update program is executed. At step 58, the remote update program processes the file (which includes utilizing the header to identify the file to the remote update program) and, at step 60 the remote update program writes the BIOS image to the memory.

Figure 5:
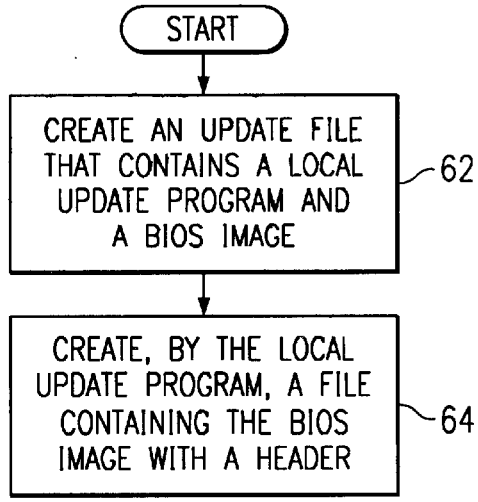
FIG. 5 is a flow chart depicting a method for combining local and remote BIOS image update programs into one update program in accordance with the present disclosure.

Referring to FIG. 5, a method for combining local and remote BIOS update images into one update program begins at step 62 where an update file that contains a local update program and a BIOS image is created. The method proceeds to step 64 where the local update program creates a file containing the BIOS image with a header.

The present disclosure thus enjoys several advantages. For example, only one file is used by a system administrator, user, client or automated process to perform local and/or remote BIOS updates which saves time and reduces confusion. Additionally, system management statistics may be collected for monitoring and evaluating each computer and/or the entire network providing valuable metrics for assessing the quality of the network.

It is understood that variations may be made in the foregoing without departing from the scope to the present invention. For example, several different BIOS images may be used by the system administrator with the local update program in the update file. Each image may represent various BIOS changes that may be locally or remotely updated on certain machines. Further, the steps taken to create the remote update program may be reduced to make the updating process more efficient. Additionally, other statistics, such as the specific computers that have been updated and the status of those updates, can be received by the system administrator and displayed on his/her computer screen.

It is understood that other modifications, changes and substitutions are intended in the foregoing disclosure and in some instances some features of the disclosure will be employed without corresponding use of other features. Accordingly, it is appropriate that the appended claims be construed broadly and in a manner consistent with the scope of the disclosure.

What is claimed is:

1. A method for updating a basic input output system (BIOS) of a computer containing memory with one update file that contains a local update program and a BIOS image, the method comprising the steps of:

locally operating in a first mode, by the local update program, to locally write the BIOS image to the memory; and alternatively remotely operating in a second mode, by the local update program, to create an image/header file containing the BIOS image with a header, and executing a remote update program to process the image/header file to remotely write the BIOS image to the memory.

2. The method of claim 1 further comprising the step of running the local update program with an input parameter prior to creating the image/header file.

3. The method of claim 1 further comprising the step of monitoring, by the remote update program, a plurality of computers.

4. The method of claim 1 wherein the memory is contained in and/or operably coupled to the computer.

5. The method of claim 1 wherein the BIOS image is locally and/or remotely updated by at least one of: an automated process, a system administrator, a user, and a client.

6. The method of claim 3 wherein the monitoring is used to provide information regarding at least one of: software, hardware, and status to tile computer.

7. A method for updating a first basic input output system (BIOS) image of an information handling system comprising:

providing an update file including a local update program and a second BIOS image, the update file being operative in a first mode to locally update the first BIOS image of the information handling system with the second BIOS image, the update file being operative in a second mode to remotely update the first BIOS image of the information handling system with the second BIOS image.

8. The method of claim 7 wherein the second mode further includes executing the local update program with an input parameter such that in response the local update program appends a header to the second BIOS image.

9. The method of claim 8 wherein the second mode further includes executing a remote update program with the second BIOS image and header as input thereto, such that in response the remote update program updates the first BIOS image of the information handling system with the second BIOS image via a remote connection.

* * * * *